United States Patent [19]

Krejci et al.

[11] Patent Number: 4,872,897
[45] Date of Patent: Oct. 10, 1989

[54] BOTTOM TAP OF A GLASS MELTING FURNACE AND METHOD OF OPERATING THE SAME

[75] Inventors: Heinrich Krejci, Marktheidenfeld; Rudi Kessel, Lohr/Main, both of Fed. Rep. of Germany

[73] Assignee: Sorg GmbH & Co. KG, Lohr/Main, Fed. Rep. of Germany

[21] Appl. No.: 308,126

[22] Filed: Feb. 8, 1989

[30] Foreign Application Priority Data

Feb. 8, 1988 [DE] Fed. Rep. of Germany ....... 3803730

[51] Int. Cl.4 ............................................. C03B 5/26
[52] U.S. Cl. ...................................... 65/128; 65/129; 65/164; 65/326; 65/327
[58] Field of Search ................. 65/128, 129, 164, 326, 65/327

[56] References Cited

U.S. PATENT DOCUMENTS

| | | | |
|---|---|---|---|
| 1,928,288 | 9/1933 | Henry | 65/129 |
| 3,230,060 | 1/1966 | Lippmann | 65/326 X |
| 3,554,727 | 1/1971 | Stevenson | 65/327 X |
| 4,017,294 | 4/1977 | Sanford et al. | 65/326 |
| 4,402,724 | 9/1983 | Weisenburger et al. | 65/128 |
| 4,566,888 | 1/1986 | Schaefer | 65/326 X |

FOREIGN PATENT DOCUMENTS 229985 11/1985 German Democratic Rep. ... 65/128

Primary Examiner—Arthur Kellogg
Attorney, Agent, or Firm—Felfe & Lynch

[57] ABSTRACT

A bottom tap of a glass melting furnace comprises a tap brick with a tap hole in which glass is frozen when the tap is not in operation and seals the tap. A tap gate of refractory and non-oxidizing metal is urged against the tap brick underneath the tap hole which is connected as an electrode to a counter-electrode situated in a glass bath. A tap chamber is situated underneath the tap gate, and a removable insulation is provided for the tap chamber.

8 Claims, 1 Drawing Sheet

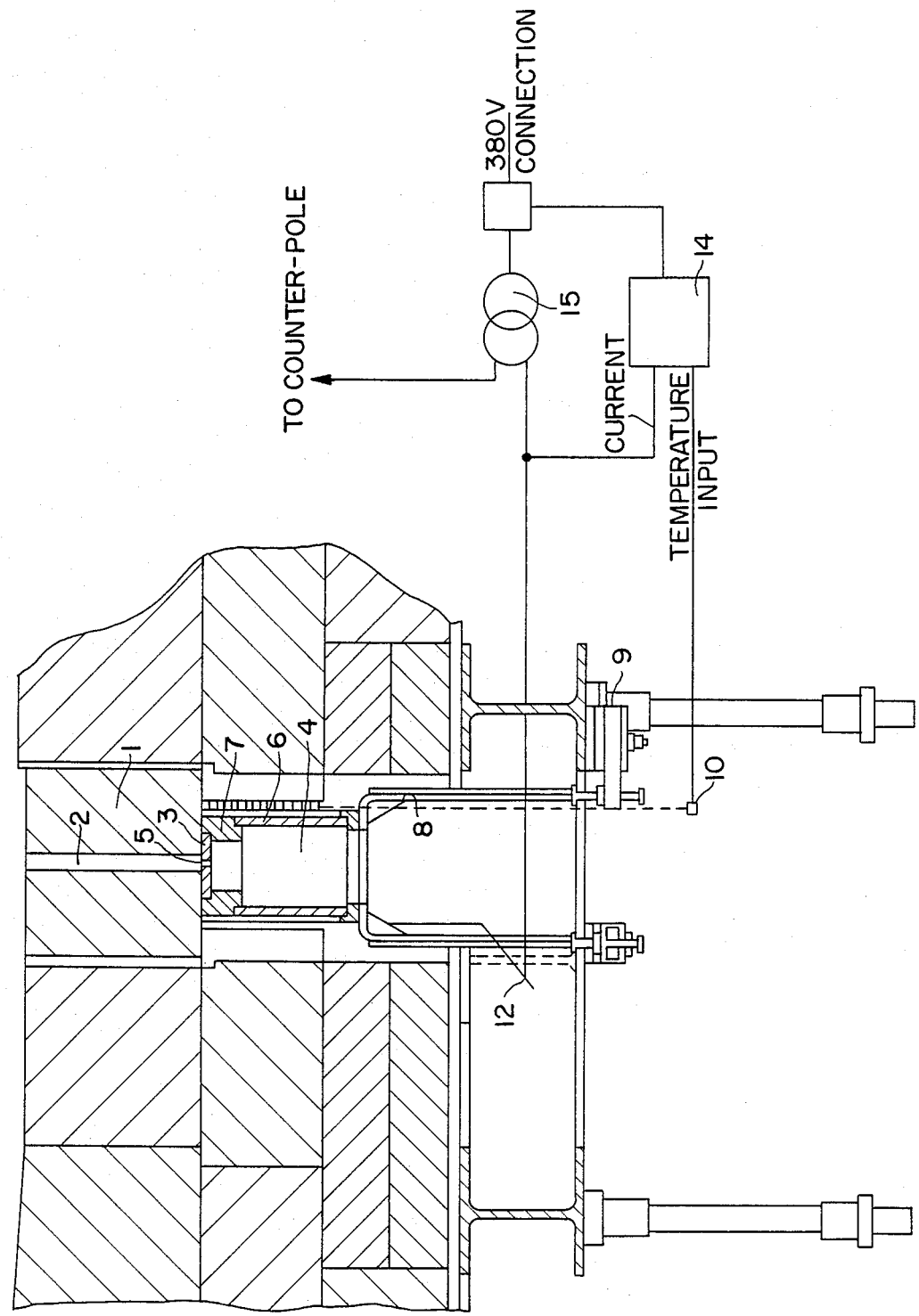

BOTTOM TAP OF A GLASS MELTING FURNACE AND METHOD OF OPERATING THE SAME

The invention relates to a discontinuously operated bottom tap of a glassmaking furnace, with a tap brick containing a hole in which the glass is frozen while the tap is not in operation and seals the tap, and to a method of operating the same.

Bottom taps in glassmaking furnaces serve either to permit the furnace to be emptied after a "furnace run", or to permit the removal of contaminated batches of glass which have collected at the bottom, or to regularly withdraw certain batches of glass from the bottom area if gob feeding is not possible or is not wanted.

Bottom taps for glass melting furnaces are known, but they have the disadvantage that either they are hard to re-close, or that their operation is no longer assured, especially after relatively long shutdowns, often amounting to years. In addition they are expensive and can constitute a safety hazard in furnace operation if they open accidentally.

It is therefore an object of the invention to provide a bottom tap for a glass melting furnace in which it will be assured that unintentional opening is impossible, but on the other hand that the operation of the tap even after a long shutdown will be so reliable that the tapping rate can be controlled.

The tap in accordance with the invention is furthermore also able to alternate between opening and closing even through years of regular operation; it is of simple construction and economical to manufacture, and permits operation by non-technical personnel.

SUMMARY OF THE INVENTION

These objects are accomplished in accordance with the invention by a tap of refractory and non-oxidizing metal pressed against the tap brick below the tap hole, which is connected as an electrode to a counter-electrode situated in the glass bath, and by a movable insulation for the tap chamber situated beneath the tap gate.

The method for the operation of the bottom tap in accordance with the invention is advantageously characterized by the fact that, to put the tap into operation, insulation is installed in the tap chamber and, after a sufficiently high temperature is reached at the tap gate, a flow of electric current is produced between the tap gate and the counter-electrode and the insulation is removed, the glass beginning to flow upon further heating. To end the tapping the electrical power feed is interrupted and the glass in the tap brick resolidifies.

Establishment of a precisely defined glass flow and hence the taking of a precisely determined amount of glass is possible, in accordance with the invention, by the fact that the glass flow is held constant during the operation of the tap by regulating the electric power input according to the temperature at the tap gate.

It is evident that the objects of the invention are accomplished with simple means and thus in a reliable manner, and the invention can therefore be considered as an ideal solution of the problems involved.

In accordance with the invention, a discontinuously operatable bottom tap of a glass melting furnace comprises a tap brick with a tap hole in which glass is frozen when the tap is not in operation and seals the tap. The tap includes a tap gate of refractory and non-oxidizing metal urged against the tap brick underneath the tap hole which is connected as an electrode to a counter-electrode situated in a glass bath. The bottom tap also includes a tap chamber situated underneath the tap gate, and a removable insulation for the tap chamber.

Also in accordance with the invention, a method of operating a bottom tap of a glass melting furnace comprising a tap brick with a tap hole in which glass is frozen when the tap is not in operation and seals the tap, a tap gate of refractory and non-oxidizing metal urged against the tap brick underneath the tap hole which is connected as an electrode to a counter-electrode situated in a glass bath, a tap chamber situated underneath the tap gate, and a removable insulation for the tap chamber, the method comprises to put the tap into operation, performing an insulating of the tap chamber. The method also comprises after a sufficient temperature is reached at the gate, producing a flow of current between the gate and the counter-electrode. The method also comprises removing the insulation, the flow of glass beginning upon continued heating. The method also comprises interrupting the input of electrical energy to end the withdrawal of glass, after which the glass again solidifies in the tap brick.

For a better understanding of the invention, together with other and further objects thereof, reference is made to the following description, taken in connection with the accompanying drawings, and its scope will be pointed out in the appended claims.

Referring now to the drawings:

The FIGURE is an elevational view in cross section through the bottom tap.

Referring more particularly to the drawing, the discontinuously operating bottom tap in accordance with the invention is installed in the bottom of a glass melting tank of conventional construction, and makes it possible to withdraw glass from the tank as needed or to empty the tank through the tap. The glass withdrawal can be performed at regular or irregular intervals, and the removal of all the glass while the furnace is in operation can be performed through the bottom tap in accordance with the invention.

The bottom tap comprises a tap brick 1 under which a tap gate 3 is disposed. The tap brick 1 has a central hole 2 whose axis is in line with a hole 5 in the tap gate.

The tap gate 3 is held by a supporting cylinder 6 through its yoke 7, the yoke 7 also being cylindrical and having an opening into which the tap gate 3 can be laid. The depth of the opening is smaller than the thickness of the tap gate, so that the latter can be urged by the supporting cylinder 6 against the tap brick 1.

This urging permits a flow from the gate 3, not only through the glass situated within the tap hole 2, but also through the tap brick 1 itself when the temperature of these parts is sufficiently high. A sufficiently high temperature will ordinarily be about 700° C.

The inside diameter of the supporting cylinder 6 is substantially greater than that of the yoke 7, the diameter being in turn considerably greater than the diameter of the hole 5 in the tap gate 3. The maximum tapping rate is therefore determined by the diameter of the hole 5, and it is in the area of this hole that freezing begins when the tap is closed.

The supporting cylinder 6 is borne by a mounting 8 of metal, which in turn is resiliently supported on the steel anchoring 9 of the furnace. The resilient springing assures a sufficient urging of the tap gate 3 under a great variety of temperature conditions.

The tap gate 3 is electrically connected to a transformer 15 and therefore constitutes one electrode. The counter-electrode is disposed within the glass bath. The conductor for the counter-electrode is marked "to counter-pole" in the drawing.

Thus, when the temperature is sufficiently high, the above-mentioned conduction of current takes place, which performs the melting of the glass in the tap hole 2 and the tap gate 3.

Also mounted on the tap gate 3 is a thermocouple, and its conductor leading to a controller 14 is marked 10. In the controller the amount of electrical power input is entered, and this controller acts on the regulated transformer 15 such that a constant outflow will be assured. It can advantageously be a simple on-off controller which shuts off the input to the regulated transformer 15 when a certain temperature level is exceeded, and turns it on again when the temperature falls below a certain temperature level.

To put the tap into operation, an insulating plug, which is not shown, is put into the tap chamber 4 in the supporting cylinder 6 and, if desired, in the area of the mounting 8, so that the temperature in the tap 3 will rise. The plug can be of glass fiber wool or the like which can be inserted manually.

When the temperature in the tap 3 has risen to about 700° C., which can be read at the controller 14, the transformer 15 is turned on and, due to the flow of current through the tap brick 1 and the glass in the tap hole 2, as described above, the glass within the hole 2 and the gate 3 melts. The insulation can be removed when the current is turned on, so that an unhampered outflow will be assured after melting.

To close the tap again, the current is shut off and the glass hardens within the tap hole 2 and the tap gate 3 and reliably closes the tap even for a long period of time.

To restore the tap to operation, the procedure described above, of installing the insulation and turning on the current, is repeated.

An important advantage of the tap in accordance with the invention is that, even after relatively long shutdowns, it can reliably be restored to operation, that control of the tapped glass can be performed with accuracy, and that it offers safety against accidental leakage of the glass.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A discontinuously operatable bottom tap of a glass melting furnace, comprising:

a tap brick with a tap hole in which glass is frozen when the tap is not in operation and seals the tap, a tap gate of refractory and non-oxidizing metal urged against the tap brick underneath the tap hole which is connected as an electrode to a counter-electrode situated in a glass bath, a tap chamber situated underneath the tap gate, and a removable insulation for the tap chamber.

2. A bottom tap in accordance with claim 1, in which the gate is a plate with a hole whose diameter is smaller than that of the tap hole, the holes having a common central axis.

3. A bottom tap in accordance with claim 1, which includes, underneath the gate, a supporting cylinder comprising refractory material and in which the supporting cylinder has a cylindrical yoke having a recess, which supporting cylinder holds the gate in the recess in its cylindrical yoke, with the central axes of the gate, the supporting cylinder, and the cylindrical yoke coinciding.

4. A bottom tap in accordance with claim 3, in which the supporting cylinder has a bottom end and which includes a mounting on a furnace anchoring, the bottom end of the supporting cylinder being supported on the mounting by the furnace anchoring.

5. A bottom tap in accordance with claim 1, in which a thermocouple is mounted on the gate.

6. A bottom tap in accordance with claim 5, which includes a controller for controlling the flow of current between the gate and the counter-electrode in accordance with the temperature at the gate.

7. A method of operating a bottom tap of a glass melting furnace comprising a tap brick with a tap hole in which glass is frozen when the tap is not in operation and seals the tap, a tap gate of refractory and non-oxidizing metal urged against the tap brick underneath the tap hole which is connected as an electrode to a counter-electrode situated in a glass bath, a tap chamber situated underneath the tap gate, and a removable insulation for the tap chamber, the method comprising:

to put the tap into operation, performing an insulating of the tap chamber;

after a sufficient temperature is reached at the gate, producing a flow of current between the gate and the counter-electrode;

removing the insulation, the flow of glass beginning upon continued heating; and interrupting the input of electrical energy, to end the withdrawal of glass, after which the glass again solidifies in the tap brick.

8. A method in accordance with claim 7, which includes controlling of the electrical energy input in accordance with the temperature at the gate to hold the flow of glass constant during the operation of the tap.

* * * * *